(12) United States Patent
Kuwabara et al.

(10) Patent No.: US 12,715,200 B2
(45) Date of Patent: Aug. 25, 2026

(54) LAMINATED BODY AND PACKAGING BAG

(71) Applicant: Fujimori Kogyo Co., Ltd., Tokyo (JP)

(72) Inventors: Hiroshi Kuwabara, Tokyo (JP); Toshihiko Mori, Tokyo (JP); Naoto Fujikawa, Tokyo (JP)

(73) Assignee: ZACROS Corporation, Tokyo (JP)

( * ) Notice: Subject to any disclaimer, the term of this patent is extended or adjusted under 35 U.S.C. 154(b) by 289 days.

(21) Appl. No.: 18/261,174

(22) PCT Filed: Jan. 13, 2022

(86) PCT No.: PCT/JP2022/000836
§ 371 (c)(1),
(2) Date: Jul. 12, 2023

(87) PCT Pub. No.: WO2022/154034
PCT Pub. Date: Jul. 21, 2022

(65) Prior Publication Data

US 2024/0066844 A1 Feb. 29, 2024

(30) Foreign Application Priority Data

Jan. 14, 2021 (JP) ................................ 2021-004164

(51) Int. Cl.
*B32B 27/08* (2006.01)
*B32B 7/12* (2006.01)
(Continued)

(52) U.S. Cl.
CPC ................ *B32B 27/08* (2013.01); *B32B 7/12* (2013.01); *B32B 27/32* (2013.01); *B65D 75/008* (2013.01);
(Continued)

(58) Field of Classification Search
CPC ........... B32B 27/08; B32B 7/12; B32B 27/32; B32B 2250/242; B32B 2255/10;
(Continued)

(56) References Cited

U.S. PATENT DOCUMENTS

2018/0079188 A1* 3/2018 Grefenstein .......... B32B 27/327
2018/0345633 A1 12/2018 Yuno et al.

FOREIGN PATENT DOCUMENTS

JP 2004075076 A 3/2004
JP 2006007630 A 1/2006
(Continued)

OTHER PUBLICATIONS

English machine translation for JP2016536160 (Year: 2016).*
(Continued)

*Primary Examiner* — Michael C Miggins
(74) *Attorney, Agent, or Firm* — Harris Beach Murtha Cullina PLLC

(57) ABSTRACT

A laminated body includes an innermost layer including a sealant formed of a polyethylene-based resin and a reinforcing layer formed of a polyethylene-based resin. The reinforcing layer is formed of an unstretched polyethylene-based resin. A packaging bag includes a bottom member folded in half along a fold line. At least the bottom member of the packaging bag is formed of the laminated body.

9 Claims, 2 Drawing Sheets

(51) Int. Cl.

| | |
|---|---|
| ***B32B 27/32*** | (2006.01) |
| ***B65D 75/00*** | (2006.01) |

(52) U.S. Cl.

CPC ..... *B32B 2250/242* (2013.01); *B32B 2255/10* (2013.01); *B32B 2307/306* (2013.01); *B32B 2307/72* (2013.01); *B32B 2439/46* (2013.01)

(58) Field of Classification Search

CPC .......... B32B 2307/306; B32B 2307/72; B32B 2439/46; B32B 2307/31; B32B 2307/518; B32B 2255/26; B32B 2255/28; B32B 2307/5825; B32B 2439/06; B65D 75/008

See application file for complete search history.

(56) References Cited

FOREIGN PATENT DOCUMENTS

| | | | |
|---|---|---|---|
| JP | 2008100500 | A | 5/2008 |
| JP | 2017081037 | A | 5/2017 |
| JP | 2018016721 | A | 2/2018 |
| JP | 2021171969 | A | 11/2021 |
| WO | 2019189092 | A1 | 10/2019 |

OTHER PUBLICATIONS

English machine translation for JP2018016721. (Year: 2018).*

English machine translation for WO2019189092. (Year: 2019).*

International Search Report for Application No. PCT/JP2022/000836 dated Apr. 5, 2022.

1 European Search Report for Application No. 22739439.2 dated Nov. 5, 2024.

* cited by examiner

LAMINATED BODY AND PACKAGING BAG

FIELD OF THE INVENTION

The present invention relates to a laminated body and a packaging bag.

BACKGROUND OF THE INVENTION

As a conventional packaging bag, a standing pouch having a self-standing property in which a bottom portion film folded in half is disposed between a pair of barrel portion films has been used. Japanese Unexamined Patent Application, First Publication No. 2006-7630 describes use of a laminated body film having a sealant as an innermost layer and a stretched film as a base material.

SUMMARY OF THE INVENTION

Technical Problem

In conventional packaging bags, a composite film used for a barrel member and a bottom member is laminated with a heat-adhesive resin (sealant) layer such as polyethylene (PE) on an inner surface, and a base material such as polyethylene terephthalate (PET) having a higher heat resistance than the sealant on an outer surface. When the barrel members are thermally adhered or the barrel member and the bottom member are thermally adhered, the sealant is melted to join inner surfaces of the composite films together. However, in a packaging bag containing different types of resins, there is a problem in that recycling it as plastic container packaging is difficult.

In recent years, mono-material container packaging using a single resin has been proposed to facilitate recycling. However, when a packaging bag is formed of a film using a single resin, there is a problem in that the bottom member is likely to be torn when the packaging bag filled with contents is dropped.

The present invention has been made in view of the above circumstances, and an objective of the present invention is to provide a laminated body and a packaging bag capable of suppressing tearing when the packaging bag filled with contents is dropped.

Solution to Problem

In order to solve the above problems, the present invention provides a laminated body which includes an innermost layer including a sealant formed of a polyethylene-based resin, and a reinforcing layer formed of a polyethylene-based resin, in which the reinforcing layer is formed of an unstretched polyethylene-based resin.

The reinforcing layer may be formed of an unstretched polyethylene having a density of 0.93 g/cm$^3$ or more.

The reinforcing layer may be directly joined adjacent to the innermost layer.

The reinforcing layer may be joined to the adjacent innermost layer via an adhesive layer.

The reinforcing layer may be joined to the adjacent innermost layer via a printed layer and an adhesive layer.

The laminated body may include a heat-resistant varnish layer as the outermost layer.

The laminated body may include an outer layer formed of a stretched polyethylene-based resin on an outer side of the reinforcing layer.

95% by weight or more of the laminated body may be formed of a polyethylene-based resin.

Also, the present invention provides a packaging bag having a bottom member folded in half along a fold line, the bottom member is sandwiched between a pair of barrel members, and at least the bottom member is formed of the laminated body.

The barrel members may each include a stretched polyethylene-based resin and a sealant layer.

Advantageous Effects of Invention

According to the present invention, since the reinforcing layer formed of an unstretched polyethylene-based resin is provided, it is possible to suppress tearing when the packaging bag filled with contents is dropped.

DETAILED DESCRIPTION OF THE INVENTION

Figure 1:
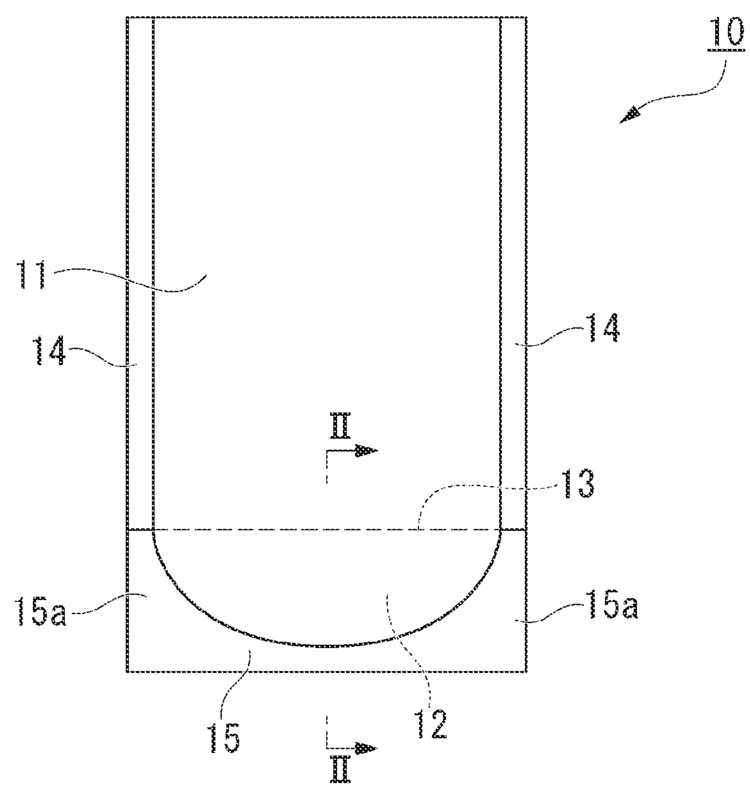
FIG. 1 is a front view showing a packaging bag of the embodiment.
Figure 2:
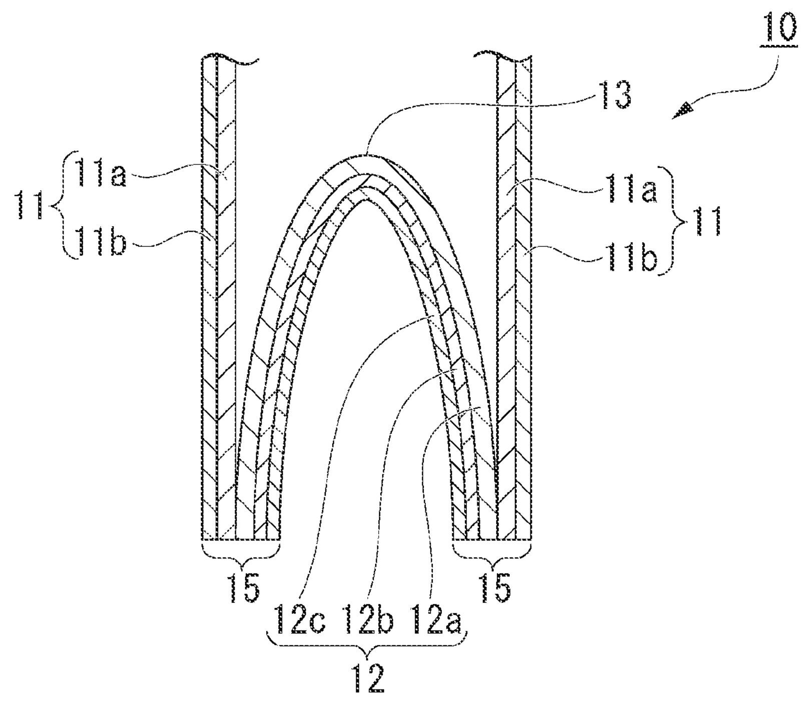
FIG. 2 is a cross-sectional view taken along line II-II of FIG. 1.

Hereinafter, the present invention will be described on the basis of preferred embodiments with reference to the drawings. FIG. 1 shows an external appearance of a packaging bag 10 of the embodiment. Also, FIG. 2 is a cross-sectional view taken along line II-II of FIG. 1. The front and rear sides of the packaging bag 10 correspond to a direction perpendicular to the paper surface in FIG. 1. The front and rear sides of the packaging bag 10 correspond to a left-right direction in FIG. 2. The packaging bag 10 is formed of a pair of barrel members 11, and a bottom member 12 folded in half along a fold line 13. The bottom member 12 is folded by the fold line 13 such that outer surfaces face each other.

The barrel member 11 and the bottom member 12 are formed of a polyethylene-based resin layer mainly composed of a polyethylene-based resin. Therefore, the packaging bag 10 can realize mono-material container packaging. Specifically, examples of the polyethylene-based resin layer include a sealant layer 11*a*, a base material layer 11*b*, an innermost layer 12*a*, a reinforcing layer 12*c*, an outer layer (not shown in the drawings), and the like to be described later, but are not limited to these.

The polyethylene-based resin described above may be an ethylene homopolymer or a copolymer mainly composed of ethylene. As a monomer (comonomer) other than ethylene, one or more of α-olefins such as 1-butene, 1-hexene, and 1-octene, cyclic olefins such as norbornene, vinyl-based monomers such as vinyl acetate, vinyl chloride, and acrylic acid, and the like can be mentioned. When the polyethylene-based resin is copolymerized with a monomer having an ester group such as vinyl acetate, a part of the ester groups may be saponified to form a copolymer containing vinyl alcohol.

A proportion of ethylene in constituent monomers of the polyethylene-based resin is preferably 50% by weight or more, and may be, for example, 80 to 100% by weight. The ethylene or the comonomer may be a compound derived from fossil resources such as petroleum, or may be a compound derived from biomass such as plants. A resin contained in the polyethylene-based resin layer may be only a polyethylene-based resin. The polyethylene-based resin layer may contain an additive besides the resin. The additive is not particularly limited, and examples thereof include an antioxidant, a lubricant, an anti-blocking agent, a flame retardant, an ultraviolet absorber, a light stabilizer, an anti-static agent, a colorant, and a cross-linking agent. The additive may be a component compatible with the resin or may be a component that is not compatible with the resin.

At least a part of the polyethylene-based resin may include a recycled polyethylene-based resin. The recycled polyethylene-based resin may be a polyethylene-based resin obtained by chemical recycling in which a used polyethylene-based resin is decomposed into a monomer such as ethylene and then polymerized again. A polyethylene-based resin obtained by mechanical recycling in which a used polyethylene-based resin is recycled as a polymer through processes such as pulverization and sorting may also be used. A mixture of a recycled polyethylene-based resin and a new polyethylene-based resin may also be used.

The barrel members 11 are each disposed in the front and rear of the packaging bag 10. The barrel members 11 on the front and rear of the packaging bag 10 may be formed to have the same planar shape as each other. Barrel seal portions 14 are formed at the left and right of the packaging bag 10 above the fold line 13. In the barrel seal portions 14, inner surfaces of the front and rear barrel members 11 are joined together along the left and right circumferential edge portions of the packaging bag 10.

The bottom member 12 is sandwiched between the front and rear barrel members 11 with the fold line 13 on an upper side. In a plan view shown in FIG. 1, the fold line 13 is an upper end of the bottom member 12. Below the fold line 13, a bottom seal portion 15 in which an inner surface of the bottom member 12 is joined to an inner surface of the barrel member 11 is formed. As shown in FIG. 2, the bottom seal portion 15 joins each portion of the bottom member 12 defined by the fold line 13 to the barrel member 11 on the same side.

An unsealed portion of the packaging bag 10 surrounded by the barrel seal portions 14 and the bottom seal portions 15 forms a storage space for contents inside the packaging bag 10. If the bottom member 12 is unfolded forward and rearward, the packaging bag 10 can stand on its own with the bottom member 12 on a lower side in a vertical direction. Inner surfaces of the barrel member 11 and the bottom member 12 are surfaces on a side in contact with the storage space for the contents. Outer surfaces of the barrel member 11 and the bottom member 12 are surfaces on a side opposite to the inner surfaces.

The barrel members 11 are each formed of a laminated body including the sealant layer 11*a* formed of a polyethylene-based resin, and the base material layer 11*b* formed of a polyethylene-based resin. The sealant layer 11*a* is an innermost layer disposed on the inner surface of the barrel member 11. The base material layer 11*b* may be an outermost layer of the barrel member 11. The barrel member 11 may have the sealant layer 11*a* and a stretched polyethylene-based resin layer.

The sealant layer 11*a* of the barrel member 11 can be used for joining the barrel members 11 together and for joining the barrel member 11 and the bottom member 12 together. The sealant layer 11*a* is preferably formed of an unstretched polyethylene-based resin. As a specific example of a material forming the sealant layer 11*a*, a polyethylene-based resin with a relatively low density such as, for example, linear low-density polyethylene (LLDPE) and low-density polyethylene (LDPE) can be mentioned. The material forming the sealant layer 11*a* may be one type of a polyethylene-based resin or may be a blend of two or more types of a polyethylene-based resin. A thickness of the sealant layer 11*a* is not particularly limited, and may be, for example, approximately 60 to 180 μm.

The base material layer 11*b* of the barrel member 11 is laminated on an outer side of the sealant layer 11*a* in a thickness direction in the laminated body forming the barrel member 11. It is preferable that the base material layer 11*b* can reinforce a mechanical strength of the barrel member 11 when the barrel member 11 is used by being conveyed in a length direction, or the like. In a conventional laminated film, a PET film or the like has been used as a base material layer 11*b*, but in the barrel member 11 of the embodiment, the polyethylene-based resin film is used as the barrel member 11, and therefore recyclability is improved.

The base material layer 11*b* of the barrel member 11 may be formed of a stretched polyethylene-based resin, or may be formed of an unstretched polyethylene-based resin. As a specific example of a material forming the base material layer 11*b*, a polyethylene-based resin with a relatively high density such as, for example, medium density polyethylene (MDPE) and high density polyethylene (HDPE) can be mentioned. The material forming the base material layer 11*b* may be one type of a polyethylene-based resin or may be a blend of two or more types of a polyethylene-based resin. A thickness of the base material layer 11*b* is not particularly limited, and may be, for example, approximately 10 to 50 μm.

A proportion occupied by a thickness of the sealant layer 11*a* with respect to a thickness of the barrel member 11 is preferably 50% or more, and may be approximately 60%, 70%, 80%, 90%, 95%, or an intermediate value of these. A proportion occupied by a total thickness of the sealant layer 11*a* and the base material layer 11*b* with respect to the thickness of the barrel member 11 is preferably 50% or more, and may be approximately 60%, 70%, 80%, 90%, 95%, 99%, or an intermediate value of these.

The bottom member 12 includes the innermost layer 12*a* including a sealant formed of a polyethylene-based resin, and the reinforcing layer 12*c* formed of an unstretched polyethylene-based resin. An adhesive layer 12*b* may be interposed between the innermost layer 12*a* and the reinforcing layer 12*c*. When the innermost layer 12*a* and the reinforcing layer 12*c* are simultaneously formed by co-extrusion, the adhesive layer 12*b* may be omitted, and the reinforcing layer 12*c* may be directly joined adjacent to the innermost layer 12*a*.

The innermost layer 12*a* of the bottom member 12 can be used for joining the barrel member 11 and the bottom member 12 together. The innermost layer 12*a* is preferably formed of an unstretched polyethylene-based resin. As a specific example of a material forming the innermost layer 12*a*, a polyethylene-based resin with a relatively low density such as, for example, linear low-density polyethylene (LLDPE) and low-density polyethylene (LDPE) can be mentioned. The material forming the innermost layer 12*a* may be one type of a polyethylene-based resin or may be a blend of two or more types of a polyethylene-based resin. A thickness of the innermost layer 12*a* is not particularly limited, and may be, for example, approximately 60 to 180 μm.

The reinforcing layer 12*c* of the bottom member 12 is laminated on an outer side of the innermost layer 12*a* in a thickness direction in the laminated body forming the bottom member 12. It is preferable that the reinforcing layer 12*c* can reinforce a mechanical strength of the bottom member 12 when the bottom member 12 is used by being conveyed in a length direction, or the like. In a conventional laminated film, a PET film or the like has been used as a base material layer, but in the bottom member 12 of the embodiment, the polyethylene-based resin film is used as the reinforcing layer 12*c*, and therefore recyclability is improved. Also, when the reinforcing layer 12*c* has a resin layer with a relatively high density such as a density of 0.93 g/cm$^3$ or more, barrier properties are improved.

The reinforcing layer 12*c* is formed of an unstretched polyethylene-based resin. As a specific example of a material forming the reinforcing layer 12*c*, a polyethylene-based resin with a relatively high density such as, for example, medium density polyethylene (MDPE) and high density polyethylene (HDPE) can be mentioned. The material forming the reinforcing layer 12*c* may be one type of a polyethylene-based resin or may be a blend of two or more types of a polyethylene-based resin. A thickness of the reinforcing layer 12*c* is not particularly limited, and may be, for example, approximately 10 to 50 μm.

Since the reinforcing layer 12*c* is formed of an unstretched polyethylene-based resin, a property of tending to be torn in a specific direction is weak compared to that with a uniaxially stretched polyethylene-based resin. Therefore, when the laminated body having the reinforcing layer 12*c* is used as the bottom member 12, it is possible to suppress tearing when the packaging bag 10 filled with contents is dropped. Also, when the innermost layer 12*a* and the reinforcing layer 12*c* are formed of an unstretched polyethylene-based resin, there is no need to adjust a stretching ratio and a stretching direction, film formation or procurement is easy, the degree of freedom in design can be improved, and costs can be reduced.

The bottom member 12 can include a polyethylene-based resin layer in addition to the innermost layer 12*a* and the reinforcing layer 12*c*. For example, an outer layer (not shown in the drawings) formed of a polyethylene-based resin may be laminated on an outer side of the reinforcing layer 12*c*. The outer layer of the bottom member 12 may be formed of a stretched polyethylene-based resin, or may be formed of an unstretched polyethylene-based resin. As a specific example of a material forming the outer layer, a polyethylene-based resin with a relatively high density such as, for example, medium density polyethylene (MDPE) and high density polyethylene (HDPE) can be mentioned. The material forming the outer layer may be one type of a polyethylene-based resin or may be a blend of two or more types of a polyethylene-based resin. A thickness of the outer layer is not particularly limited, and may be, for example, approximately 10 to 50 μm.

A proportion occupied by a thickness of the innermost layer 12*a* with respect to a thickness of the bottom member 12 is preferably 50% or more, and may be approximately 60%, 70%, 80%, 90%, 95%, or an intermediate value of these. A proportion occupied by a total thickness of the polyethylene-based resin layers (the innermost layer 12*a*, the reinforcing layer 12*c*, the outer layer, and the like) with respect to the thickness of the bottom member 12 is preferably 50% or more, and may be approximately 60%, 70%, 80%, 90%, 95%, 99%, or an intermediate value of these.

When materials of the innermost layer 12*a* and the reinforcing layer 12*c* are different, it is preferable to interpose the adhesive layer 12*b* therebetween. Also, when the bottom member 12 has the outer layer on an outer side of the reinforcing layer 12*c*, the adhesive layer 12*b* may be laminated between the reinforcing layer 12*c* and the outer layer to join the reinforcing layer 12*c* and the outer layer together.

The adhesive layer 12*b* may be formed of an adhesive or an anchor coating agent. A material forming the adhesive layer 12*b* is not particularly limited, and examples thereof include a urethane-based compound, an epoxy-based compound, an isocyanate-based compound, polyethyleneimine, an organic titanium compound such as titanium alkoxide, and the like. A thickness of the adhesive layer 12*b* may be, for example, approximately 0.1 to 10 μm, approximately 1 to 6 μm, and approximately 3 to 4 μm. The adhesive layer 12*b* may contain a resin, or may be an adhesive layer 12*b* not containing a resin.

In the bottom member 12, a printed layer (not shown in the drawings) may be laminated between the innermost layer 12*a* and the reinforcing layer 12*c*. When the bottom member 12 has the outer layer on an outer side of the reinforcing layer 12*c*, a printed layer may be laminated between the reinforcing layer 12*c* and the outer layer. A position of the printed layer is not particularly limited, and may be, for example, on an outer surface of the innermost layer 12*a*, an inner surface or an outer surface of the reinforcing layer 12*c*, an inner surface or an outer surface of the outer layer, or the like.

The printed layer can be formed by printing ink solidly or in a pattern by a printing method such as gravure printing, letterpress printing, offset printing, screen printing, or inkjet. A thickness of the printed layer is not particularly limited, and may be approximately 0.5 to 10 μm. The printed layer may be formed on the entire surface of the laminated body, or may be formed on a portion within a surface of the laminated body. Two or more printed layers may be overlapped.

An ink for forming the printed layer may contain a coloring material such as a pigment and a dye, and a binder. The binder is not particularly limited, and examples thereof may include polyamide, polyurethane, polyester, polyvinyl chloride, polyvinyl acetate, a vinyl chloride-vinyl acetate copolymer, an acrylic-based polymer, polybutadiene, cyclized rubber, and the like. The ink may contain a solvent such as water, an organic solvent, and a vegetable oil. After printing, the ink can be dried by volatilizing the solvent, curing the ink, or the like. In order to promote drying of the ink, heating, ultraviolet irradiation, or the like may be performed. The printed layer may contain a resin, or may be a printed layer not containing a resin.

The laminated body forming the bottom member 12 may include a heat-resistant varnish layer (not shown in the drawings) as an outermost layer. The heat-resistant varnish layer may be any layer that is superior in heat resistance to the reinforcing layer 12*c* or the outer layer. By laminating the heat-resistant varnish layer as the outermost layer of the bottom member 12, when the inner surface of the bottom member 12 is joined (sealed) to the barrel member 11, adhesion (blocking) of the outer surfaces of the bottom members 12 can be suppressed even if the bottom members 12 overlap each other.

The heat-resistant varnish layer may be formed by applying varnish on the outer surface of the bottom member 12, and then improving heat resistance of the coated film by drying, curing, or the like. The varnish may contain a resin and a solvent, or may contain a solventless resin. The resin used for the varnish is not particularly limited, and examples thereof may include one or more of a urethane resin, an acrylic resin, an epoxy resin, a polymethylpentene resin, a cyclic olefin-based resin, an unsaturated polyester resin, an alkyd resin, a polyimide resin, a polyamide-imide resin, a polyamide resin, and the like. The solvent for the varnish can be appropriately selected in consideration of the performance or the like when it is applied to the polyethylene-based resin.

The heat-resistant varnish layer can be directly formed without an adhesive layer or the like interposed between itself and the reinforcing layer 12*c* or the outer layer. When a printed layer is formed on an outer surface of the reinforcing layer 12*c* or the outer layer, the heat-resistant varnish layer may be overlaid on the printed layer. In this case, the printed layer can be protected by the heat-resistant varnish layer of the outermost layer. The heat-resistant varnish layer may be formed on the entire surface of the reinforcing layer 12*c* or the outer layer. The heat-resistant varnish layer may be formed on a partial region of the reinforcing layer 12*c* or the outer layer.

For example, the heat-resistant varnish layer may be locally formed in a region of the outer surface of the bottom member 12 corresponding to the bottom seal portion 15 which is a portion to which the inner surface of the bottom member 12 is joined. The reinforcing layer 12*c* may be exposed on the outer surface of the bottom member 12 in a region in which the heat-resistant varnish layer is not formed. In this case, the reinforcing layers 12*c* may be joined to face each other at side end portions 15*a* on the left and right of the bottom seal portion 15 or the like with the heat-resistant varnish layer omitted.

A thickness of the heat-resistant varnish layer is preferably, for example, 10 μm or less. A specific example of the thickness of the heat-resistant varnish layer is not particularly limited, and may be approximately 10 μm, 8 μm, 6 μm, 5 μm, 4 μm, 3 μm, 2 μm, 1 μm, 0.5 μm, 0.2 μm, 0.1 μm, or an intermediate value of these.

As a different material layer other than the resin layer, the adhesive layer 12*b*, a heat-resistant varnish layer, a deposition layer, a printed layer, a coating layer, or the like may be laminated on the laminated body that forms the barrel member 11 or the bottom member 12. As the different material, a metal such as aluminum, an inorganic compound such as silica and alumina, and the like can be mentioned. The printed layer, the coating layer, the adhesive layer, or the like may contain a resin other than polyethylene as a material of an ink, a paint, an adhesive, or the like. A method of forming the laminated body is not particularly limited, and examples thereof may include dry lamination, extrusion lamination, heat lamination, co-extrusion, coating, and the like. Different methods may be used to laminate each of the layers.

In the laminated body of the embodiment, a layer with a small thickness such as the adhesive layer, the printed layer, and the heat-resistant varnish layer may be a layer containing a resin. A layer with a relatively large thickness other than those is preferably only the polyethylene-based resin layer. A thickness of the layer with a small thickness may be, for example, 10 μm or less or 5 μm or less as a thickness of each layer or a total thickness of the layers. 95% by weight or more of the laminated body of the embodiment may be formed of a polyethylene-based resin.

The reinforcing layer 12*c* is preferably adjacent to or close to the innermost layer 12*a* in a thickness direction of the laminated body. The reinforcing layer 12*c* may be joined directly to the innermost layer 12*a* adjacent to the reinforcing layer 12*c* without interposing the adhesive layer 12*b*. The reinforcing layer 12*c* may be joined to the adjacent innermost layer 12*a* via the adhesive layer 12*b*. The reinforcing layer 12*c* may be joined to the adjacent innermost layer 12*a* via the printed layer and the adhesive layer 12*b*. When another layer (an adhesive layer, a printed layer, or the like) is interposed between the innermost layer 12*a* and the reinforcing layer 12*c*, a thickness of each layer or a total thickness of the layers may be, for example, 10 μm or less or 5 μm or less.

When the polyethylene-based resin layer is used for two layers of the innermost layer and the reinforcing layer, examples of a layer configuration of the laminated body forming the bottom member 12 may include "innermost layer/reinforcing layer," "innermost layer/reinforcing layer/heat-resistant varnish layer," "innermost layer/reinforcing layer/printed layer," "innermost layer/reinforcing layer/printed layer/heat-resistant varnish layer," "innermost layer/adhesive layer/reinforcing layer," "innermost layer/adhesive layer/reinforcing layer/heat-resistant varnish layer," "innermost layer/adhesive layer/reinforcing layer/printed layer," "innermost layer/adhesive layer/reinforcing layer/printed layer/heat-resistant varnish layer," "innermost layer/adhesive layer/printed layer/reinforcing layer," "innermost layer/adhesive layer/printed layer/reinforcing layer/heat-resistant varnish layer," "innermost layer/adhesive layer/printed layer/reinforcing layer/printed layer," "innermost layer/adhesive layer/printed layer/reinforcing layer/printed layer/heat-resistant varnish layer," and the like.

When the polyethylene-based resin layer is used for three layers of the innermost layer, the reinforcing layer, and the outer layer, examples of a layer configuration of the laminated body forming the bottom member 12 may include "innermost layer/adhesive layer/reinforcing layer/adhesive layer/outer layer," "innermost layer/adhesive layer/reinforcing layer/adhesive layer/outer layer/heat-resistant varnish layer," "innermost layer/adhesive layer/reinforcing layer/adhesive layer/outer layer/printed layer," "innermost layer/adhesive layer/reinforcing layer/adhesive layer/outer layer/printed layer/heat-resistant varnish layer," "innermost layer/adhesive layer/reinforcing layer/adhesive layer/printed layer/outer layer," "innermost layer/adhesive layer/reinforcing layer/adhesive layer/printed layer/outer layer/heat-resistant varnish layer," "innermost layer/adhesive layer/reinforcing layer/adhesive layer/printed layer/outer layer/printed layer," "innermost layer/adhesive layer/reinforcing layer/adhesive layer/printed layer/outer layer/printed layer/heat-resistant varnish layer," and the like.

n a case in which the innermost layer 12*a* and the reinforcing layer 12*c* are simultaneously formed by co-extrusion and the adhesive layer 12*b* is omitted, an outer layer formed of a polyethylene-based resin may be laminated on an outer side of the reinforcing layer 12*c*. The innermost layer 12*a* and the reinforcing layer 12*c* may also be used as a sealant.

Although dimensions of the packaging bag 10 are not particularly limited, for example, in an application of a refill container, a height in the vertical direction may be approximately 100 to 500 mm, a width in a left-right direction may be approximately 70 to 300 mm, and a filling amount may be approximately 100 $cm^3$ to 5000 $cm^3$. As a state of the contents, fluids such as liquids, powders, and granules. Types of the contents are not particularly limited, and examples thereof include detergents, drugs, cosmetics, pharmaceutical products, beverages, seasonings, inks, paints, fuels, and the like.

The packaging bag 10 may include a filling port, a pouring port, and the like. In the example shown in FIG. 1, an opening can be provided between the front and rear barrel members 11 at an upper portion of the packaging bag 10, and can be used for filling or pouring the contents. After filling it with the contents, the barrel members 11 may be joined together to seal the packaging bag 10. At the time of opening the packaging bag 10, the portion in which the barrel members 11 have been joined together may be removed by cutting, tearing or the like. Although not particularly shown, the pouring port may be formed in a shape protruding thinly at an upper portion or a corner of the packaging bag 10.

A method for manufacturing the packaging bag 10 is not particularly limited, and examples thereof include a method having a step of forming the fold line 13 in the bottom member 12, a step of sandwiching the bottom member 12 between the pair of barrel members 11, and a step of joining inner surfaces of the laminated bodies to form the barrel seal portion 14 and the bottom seal portion 15. Original fabrics of the barrel member 11 and the bottom member 12 may be a long web extending in a direction of the fold line 13. The web may be conveyed in a longitudinal direction. The packaging bag 10 formed on the web can be separated into individual packaging bags 10 by cutting in a longitudinal direction, a cross direction (width direction), or other directions.

Figure 3:
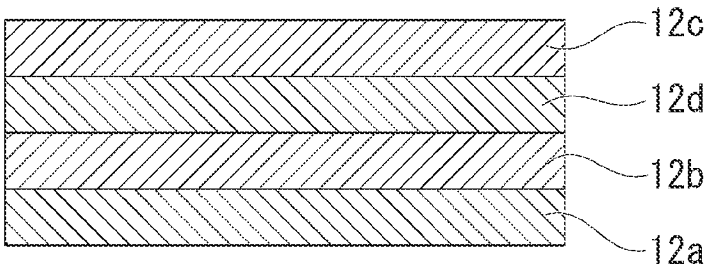
FIG. 3 is a schematic cross-sectional view showing a laminated body of the embodiment.

FIG. 3 is a schematic cross-sectional view showing the laminated body of the embodiment. As shown in FIG. 3, the laminated body includes the sealant layer 12*a*, the adhesive layer 12*b*, a printed layer 12*d*, and the reinforcing layer 12*c* laminated in that order.

A lamination order of the adhesive layer 12*b* and the printed layer 12*d* may be opposite to the lamination order shown in FIG. 3. That is, the laminated body may have a configuration in which the sealant layer 12*a*, the printed layer 12*d*, the adhesive layer 12*b*, and the reinforcing layer 12*c* are laminated in that order.

A method of recycling after using the laminated body or the packaging bag of the embodiment is not particularly limited, and can be appropriately selected according to a state or the like at the time of collection. In the laminated body of the embodiment, since a proportion of the polyethylene-based resin can be increased, both the chemical recycling and the mechanical recycling described above are possible. When the laminated body or the packaging bag of the embodiment is recycled, it can also be recycled into products of the same type such as laminated bodies or packaging bags. Materials obtained by recycling may be utilized in products such as paints, molded products, and hydrocarbon oils.

While the present invention has been described above with reference to preferred embodiments, the present invention is not limited to the above-described embodiments, and various modifications can be made within a range not departing from the gist of the present invention. Modifications include additions, substitutions, omissions, and other changes of constituent elements.

The laminated body of the embodiment is in a form of a laminated film mainly composed of a polyethylene-based resin, is not limited to applications of packaging bags such as pouches, bags, and containers, and can be used for various applications. If the laminated body is a flexible laminated film, a packaging bag for soft packaging can be formed. The packaging bag may only be formed of the laminated body described above, or may be combined with attachment members such as labels, tags, straws, and outer boxes. From the perspective of recycling, the attachment members are preferably separable from the packaging bag.

The base material layer 11*b* of the barrel member 11 may be a polyethylene-based resin layer similar to the reinforcing layer 12*c* of the bottom member 12. Also, the sealant layer 11*a* of the barrel member 11 may be a polyethylene-based resin layer similar to the innermost layer 12*a* of the bottom member 12. The laminated body exemplified as the bottom member 12 of the embodiment may be used to form the barrel member 11. The laminated body exemplified as the bottom member 12 of the embodiment may be used not only for the lower portion of the packaging bag, but also for a member, that is folded in half or folded in three or more along a fold line, at the upper portion or the left and right side portions of the packaging bag.

EXAMPLES

Hereinafter, description will be made more specifically with examples, but the present invention is not limited to these examples.

Example 1

A sealant layer can be formed from a film of LDPE or LLDPE. A reinforcing layer can be formed from an unstretched MDPE or HDPE film. A printed layer may be formed on an inner surface of the reinforcing layer, and a heat-resistant varnish layer may be formed on an outer surface of the reinforcing layer. A laminated body of example 1 can be formed by laminating the sealant layer and the reinforcing layer by a dry lamination method with an adhesive layer interposed therebetween.

Example 2

A sealant layer can be formed from a film of LDPE or LLDPE. A reinforcing layer can be formed from an unstretched MDPE or HDPE film. An outer layer can be formed from a stretched MDPE or HDPE film. A printed layer may be formed on an inner surface of the outer layer. A laminated body of example 2 can be formed by laminating the sealant layer, the reinforcing layer, and the outer layer by a dry lamination method with adhesive layers interposed therebetween.

Example 3

A sealant layer formed of LDPE or LLDPE and a reinforcing layer formed of MDPE or HDPE are simultaneously formed by co-extrusion to form a laminated body of example 3. Further, a printed layer and a heat-resistant varnish layer may be formed in that order on an outer surface of the reinforcing layer.

Comparative Example 1

A sealant layer is formed from an LDPE or LLDPE film. A base material layer is formed from a uniaxially stretched polyester (PET) film having a printed layer on an inner surface thereof. A laminated body of comparative example 1 is formed by laminating the sealant layer and the base material layer by a dry lamination method with an adhesive layer interposed therebetween.

Comparative Example 2

A sealant layer is formed from an LDPE or LLDPE film. A base material layer is formed from a uniaxially stretched PE film having a printed layer on an inner surface thereof. A laminated body of comparative example 2 is formed by laminating the sealant layer and the base material layer by a dry lamination method with an adhesive layer interposed therebetween.

The laminated body of comparative example 1 is not easy to recycle because different types of resins (PE and PET) are laminated. Since the laminated body of comparative example 2 contains a uniaxially stretched PE, it has a lower strength and is easier to be torn in the stretching direction compared to the laminated body of comparative example 1 containing PET. On the other hand, the laminated bodies of examples 1 to 3 do not contain a uniaxially stretched resin layer while they are mainly composed of the PE resin, and thus are difficult to tear. Even when the laminated bodies are used as a material for the packaging bag, it is possible to suppress tearing when the packaging bag filled with contents is dropped. Also, since the laminated bodies of examples 1 to 3 have a resin layer with a relatively high density such as MDPE or HDPE, barrier properties are improved.

Example 4

According to example 1, a bottom member was formed using a laminated body in which an unstretched PE film and a sealant layer were laminated by dry lamination. Also, a barrel member was formed using a laminated body in which a uniaxially stretched PE film and a sealant layer were laminated by dry lamination. From these bottom member and barrel member, a self-supporting bag with a width of 130 mm and a height of 220 mm was manufactured.

Comparative Example 3

According to comparative example 2, a self-supporting bag was manufactured in the same manner as in example 4 except that a bottom member was formed using a laminated body in which a uniaxially stretched PE film and a sealant layer were laminated by dry lamination.

(Conditions of Drop Test)

After the self-supporting bag of example 4 or comparative example 3 was filled with water of 360 g, the self-supporting bag was sealed to prepare a specimen for a drop test. The specimen was repeatedly dropped five times in a vertical direction and five times in a horizontal direction from a height of 1 m in an environment of 5° C. Dropping in the vertical direction is a case in which the specimen is dropped such that a sealed portion around the self-supporting bag hits a drop surface. A horizontal drop is a case in which the specimen is dropped such that a flat surface of the self-supporting bag hits the drop surface inside the sealed portion.

(Results of Drop Test)

In a case of the self-supporting bag of example 4, the number of torn bags was zero (no broken bag) out of 100 bags. In a case of the self-supporting bag of example 3, the number of torn bags was 15 out of 100 bags. In comparative example 3, all of the self-standing bags that were torn were torn from the bottom member. From this, in example 4, it can be ascertained that tearing of the bag due to dropping can be suppressed by changing a material of the bottom member.

INDUSTRIAL APPLICABILITY

According to the present invention, is possible to suppress tearing when the packaging bag filled with contents is dropped, and therefore industrial application is possible.

REFERENCE SIGNS LIST

10 Packaging bag
11 Barrel member
11*a* Sealant layer
11*b* Base material layer
12 Bottom member
12*a* Innermost layer
12*b* Adhesive layer
12*c* Reinforcing layer
12*d* Printed layer
13 Fold line
14 Barrel seal portion
15 Bottom seal portion
15*a* Side end portion

The invention claimed is:

1. A laminated body comprising:
an innermost layer including a sealant formed of a polyethylene-based resin;
a reinforcing layer formed of an unstretched polyethylene-based resin, and
an outer layer formed of a stretched polyethylene-based resin, in this order, wherein
a thickness of the innermost layer is 60 to 180 μm;
a thickness of the reinforcing layer is 10 to 50 μm; and
a thickness of the outer layer is 10 to 50 μm.

2. The laminated body according to claim 1, wherein the reinforcing layer is formed of an unstretched polyethylene having a density of 0.93 g/cm3 or more.

3. The laminated body according to claim 1, wherein the reinforcing layer is directly joined adjacent to the innermost layer.

4. The laminated body according to claim 1, wherein the reinforcing layer is joined to the adjacent innermost layer via an adhesive layer.

5. The laminated body according to claim 1, wherein the reinforcing layer is joined to the adjacent innermost layer via a printed layer and an adhesive layer.

6. The laminated body according to claim 1, wherein the laminated body includes a heat-resistant varnish layer as the outermost layer.

7. The laminated body according to claim 1, wherein 95% by weight or more of the laminated body is formed of a polyethylene-based resin.

8. A packaging bag having a bottom member folded in half along a fold line, the bottom member being sandwiched between a pair of barrel members, wherein at least the bottom member is formed of the laminated body according to claim 1.

9. The packaging bag according to claim 8, wherein the barrel members each include a stretched polyethylene-based resin and a sealant layer.

* * * * *